(12) United States Patent
Keramidas et al.

(10) Patent No.: US 12,470,724 B2
(45) Date of Patent: Nov. 11, 2025

(54) FIXED-SIZE BLOCK COMPRESSION TECHNIQUES FOR RGB CHANNELS

(71) Applicant: Think Silicon Research and Technology Single Member S.A., Rion Achaias (GR)

(72) Inventors: Georgios Keramidas, Patras (GR); Ioannis Manthopoulos, Thessalonika (GR); Ioannis Blagas, Thessalonika (GR); Athanasia Lytra, Thessalonika (GR); Chrysa Kokkala, Patras (GR); Iakovos Stamoulis, Patras (GR)

(73) Assignee: Think Silicon Research and Technology Single Member S.A., Rion Achaias (GR)

( * ) Notice: Subject to any disclaimer, the term of this patent is extended or adjusted under 35 U.S.C. 154(b) by 44 days.

(21) Appl. No.: 18/296,219

(22) Filed: Apr. 5, 2023

(65) Prior Publication Data

US 2024/0333933 A1    Oct. 3, 2024

Related U.S. Application Data

(63) Continuation of application No. PCT/GR2023/000009, filed on Mar. 28, 2023.

(51) Int. Cl.
*H04N 19/124* (2014.01)
*H04N 19/182* (2014.01)
(Continued)

(52) U.S. Cl.
CPC ......... *H04N 19/186* (2014.11); *H04N 19/124* (2014.11); *H04N 19/182* (2014.11); *H04N 19/184* (2014.11)

(58) Field of Classification Search
CPC .. H04N 19/124; H04N 19/182; H04N 19/184; H04N 19/186
See application file for complete search history.

(56) References Cited

U.S. PATENT DOCUMENTS

| 7,920,749 | B1 * | 4/2011 | Donovan | ............. | H04N 19/105 |
| | | | | | 382/233 |
| 7,983,498 | B1 * | 7/2011 | Donovan | ............... | H04N 1/642 |
| | | | | | 375/240 |

(Continued)

FOREIGN PATENT DOCUMENTS

WO    0019377 A    4/2000

OTHER PUBLICATIONS

International Search Report for PCT/GR2023/000009, dated Sep. 27, 2023. Searching Authority, European Patent Office, Rijswijk, Netherlands.

(Continued)

*Primary Examiner* — Tsion B Owens
(74) *Attorney, Agent, or Firm* — M&B IP Analysts, LLC

(57) ABSTRACT

A system and method for fixed size texture compression utilizes a four pixel block. The method includes determining a first endpoint of a pixel block including four pixels, each pixel represented by a red channel, a green channel and a blue channel; determining a second endpoint of the pixel block, which is not the first endpoint; encoding the first endpoint and the second endpoint using a first plurality of bits; encoding a first quantization level using a second plurality of bits; encoding a second quantization level using a third plurality of bits; encoding a location of the first endpoint and a location of the second endpoint using a fourth plurality of bits; and encoding an addressing indicator bit based on a distance between a value of the first endpoint and a value of the second endpoint.

19 Claims, 8 Drawing Sheets

(51) Int. Cl.
*H04N 19/184* (2014.01)
*H04N 19/186* (2014.01)

(56) References Cited

U.S. PATENT DOCUMENTS

| | | |
|---|---|---|
| 9,640,149 B2 | 5/2017 | Keramidas et al. |
| 11,153,578 B2 | 10/2021 | Patel |
| 11,195,306 B2 | 12/2021 | Wu et al. |
| 11,438,608 B2 | 9/2022 | Bruls et al. |
| 2022/0067978 A1* | 3/2022 | Chang .................... H04N 19/14 |
| 2023/0046972 A1 | 2/2023 | King |

OTHER PUBLICATIONS

Written Opinion of the Searching Authority for PCT/GR2023/000009, dated Sep. 27, 2023. Searching Authority, European Patent Office, Rijswijk, Netherlands.

* cited by examiner

ND BLOCK COMPRESSION
FIXED-SIZE BLOCK COMPRESSION TECHNIQUES FOR RGB CHANNELS

CROSS-REFERENCE TO RELATED APPLICATIONS

This application claims the benefit of International Application No. PCT/GR2023/000009 filed on Mar. 28, 2023, the contents of which are hereby incorporated by reference.

TECHNICAL FIELD

The present disclosure relates generally to image compression, and specifically to block based image compression.

BACKGROUND

Digital images are the basis of information exchange and storage in modern society. Images are capable of conveying a large amount of information to humans. The abundance of digital displays, cameras, and other video-related technologies reinforces the need for image generation, projection, and storage.

It has long been recognized that processing and storing high quality images for display is desirable, and is costly as much as it is desirable, at least in terms of computational resources required to achieve this. Therefore, as long as images have been represented in digital form, so have compression schemes been utilized to minimize storage space and memory required to store and transit such digital representations.

Some compression techniques are known as lossy compressions, meaning that some information is not preserved from the original image. In some cases, this is acceptable, as the human eye may not always be capable of discerning that some information was lost. In other cases, this is not acceptable, and artifacts and the like perturb the user experience and are therefore unwanted.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions.

One or more computer programs can be configured to perform particular operations or actions by virtue of including instructions that, when executed by data processing apparatus, cause the apparatus to perform the actions. One general aspect includes a method for fixed size texture compression. The method also includes determining a first endpoint of a pixel block including four pixels, each pixel represented by a red channel, a green channel and a blue channel; determining a second endpoint of the pixel block, which is not the first endpoint; encoding the first endpoint and the second endpoint using a first plurality of bits; encoding a first quantization level using a second plurality of bits; encoding a second quantization level using a third plurality of bits; encoding a location of the first endpoint and a location of the second endpoint using a fourth plurality of bits; and encoding an addressing indicator bit based on a distance between a value of the first endpoint and a value of the second endpoint. Other embodiments of this aspect include corresponding computer systems, apparatus, and computer programs recorded on one or more computer storage devices, each configured to perform the actions of the methods.

Implementations may include one or more of the following features. The method may include: storing the first endpoint utilizing a first encoding of nineteen bits and storing the second endpoint utilizing a second encoding of nineteen bits in response to determining that the addressing indicator bit has a first binary value. The first encoding represents a red channel with 6 bits, a green channel with 7 bits, and a blue channel with 6 bits. The second encoding represents a red channel with 6 bits, a green channel with 7 bits, and a blue channel with 6 bits. The method may include: storing the first endpoint utilizing twenty four bits and storing the second endpoint utilizing a third encoding of fourteen bits in response to determining that the addressing indicator bit has a second binary value. The third encoding represents an offset from a green channel of the first endpoint with 5 bits. The third encoding further represents an offset from the red channel of the first endpoint with 5 bits. The method may include: encoding the first endpoint using 24 bits; and encoding the second endpoint such that each value of a channel of the second endpoint is encoded relative to a value of a corresponding channel of the first endpoint. A number of bits of the first portion is greater than a number of bits of each of the second portion and the third portion. Implementations of the described techniques may include hardware, a method or process, or computer software on a computer-accessible medium.

One general aspect includes a non-transitory computer readable medium having stored thereon instructions for causing a processing circuitry to execute a process. The non-transitory computer readable medium also includes determining a first endpoint of a pixel block including four pixels, each pixel represented by a red channel, a green channel and a blue channel; determining a second endpoint of the pixel block, which is not the first endpoint; encoding the first endpoint and the second endpoint using a first plurality of bits; encoding a first quantization level using a second plurality of bits; encoding a second quantization level using a third plurality of bits; encoding a location of the first endpoint and a location of the second endpoint using a fourth plurality of bits; and encoding an addressing indicator bit based on a distance between a value of the first endpoint and a value of the second endpoint. Other embodiments of this aspect include corresponding computer systems, apparatus, and computer programs recorded on one or more computer storage devices, each configured to perform the actions of the methods.

One general aspect includes a system for fixed size texture compression. The system also includes a processing circuitry. The system also includes a memory, the memory containing instructions that, when executed by the processing circuitry, configure the system to: determine a first endpoint of a pixel block including four pixels, each pixel represented by a red channel, a green channel and a blue channel; determine a second endpoint of the pixel block, which is not the first endpoint; encode the first endpoint and the second endpoint using a first plurality of bits; encode a first quantization level using a second plurality of bits; encode a second quantization level using a third plurality of bits; encode a location of the first endpoint and a location of the second endpoint using a fourth plurality of bits; and encode an addressing indicator bit based on a distance between a value of the first endpoint and a value of the second endpoint. Other embodiments of this aspect include corresponding computer systems, apparatus, and computer programs recorded on one or more computer storage devices, each configured to perform the actions of the methods.

Implementations may include one or more of the following features. The system where the memory contains further instructions which when executed by the processing circuitry further configure the system to: store the first endpoint utilizing a first encoding of nineteen bits and storing the second endpoint utilizing a second encoding of nineteen bits in response to determining that the addressing indicator bit has a first binary value. The first encoding represents a red channel with 6 bits, a green channel with 7 bits, and a blue channel with 6 bits. The second encoding represents a red channel with 6 bits, a green channel with 7 bits, and a blue channel with 6 bits. The memory contains further instructions which when executed by the processing circuitry further configure the system to: store the first endpoint utilizing twenty four bits and storing the second endpoint utilizing a third encoding of fourteen bits in response to determining that the addressing indicator bit has a second binary value. The third encoding represents an offset from a green channel of the first endpoint with 5 bits. The third encoding further represents an offset from the red channel of the first endpoint with 5 bits. The memory contains further instructions which when executed by the processing circuitry further configure the system to: encode the first endpoint using 24 bits; and encode the second endpoint such that each value of a channel of the second endpoint is encoded relative to a value of a corresponding channel of the first endpoint. The memory contains further instructions which when executed by the processing circuitry further configure the system to: encode a green channel of the first endpoint using a first portion of the first plurality of bits; encode a red channel of the first endpoint using a second portion of the first plurality of bits; and encode a blue channel of the first endpoint using a third portion of the first plurality of bits, where a number of bits of the first portion is greater than a number of bits of each of the second portion and the third portion. Implementations of the described techniques may include hardware, a method or process, or computer software on a computer-accessible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
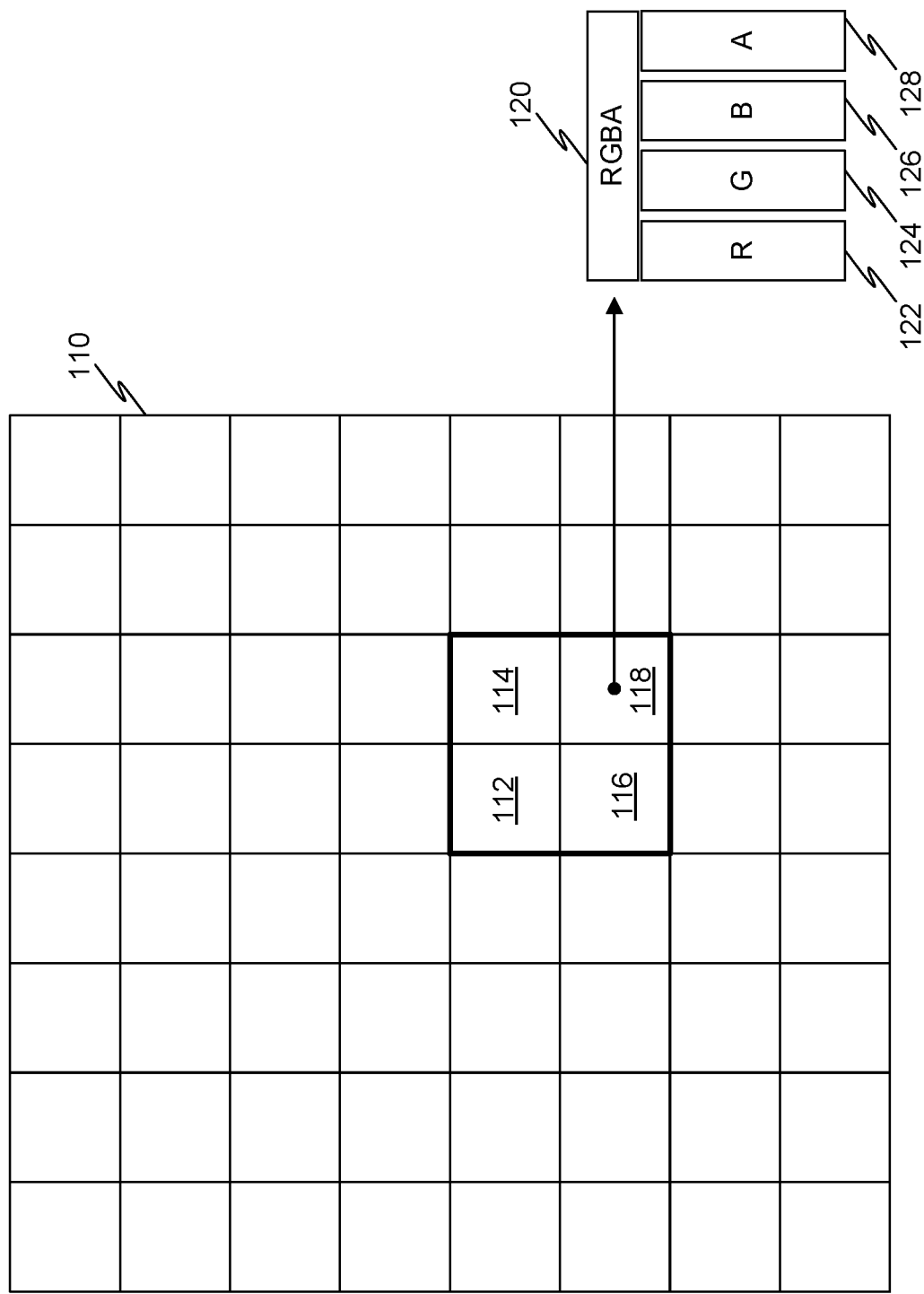
FIG. 1 is an example illustration of a digital image arranged in a pixel matrix of compressible blocks, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for block based image compression using a fixed-size block. According to an embodiment, a two by two pixel block is represented utilizing 48 bits, thus reducing the number of bits required to encode from 128 bits (32 bits per each pixel, 8 bits per each channel of each pixel), or from 64 bits (24 bits per each pixel, 8 bits per each channel of each pixel, where alpha is not included).

In some embodiments in this disclosure, reference is made to various colors, such as red, green, and blue. In certain embodiments, red is understood to be a representation of the color red which includes no green and no blue components (i.e., 255,0,0), green includes no red and no blue (i.e., 0,255,0) and blue includes no red and no green (i.e., 0,0,255).

FIG. 1 is an example illustration of a digital image arranged in a pixel matrix of compressible blocks, utilized to describe an embodiment. According to an embodiment, a digital image includes a plurality of pixels, arranged in a pixel matrix 110. Each pixel in the pixel matrix 110 is represented by a color model. In an embodiment, a color model represents a color as a tuple of numbers in a color space. For example, some color models are subtractive models, while others are additive. An example of a subtractive model includes RYB (Red-Yellow-Blue), and CMYK (Cyan-Magenta-Yellow-Black). An example of an additive model includes RGB (Red-Green-Blue).

Electronic displays, such as LEDs, OLEDs, CRTs, and the like, employ RGB model based displays, it is therefore useful to provide to such displays images which are formatted according to an appropriate color model (e.g., RGB, RGBA, and the like).

In a typical implementation, each pixel in a digital image is represented by at least 3 channels—a red channel, a green channel, and a blue channel. It is increasingly common to further encode an alpha channel, which is a measure of the pixel's transparency (or opaqueness).

For example, an uncompressed pixel is typically represented using 32 bits, each of the four channels provided 8 bits (i.e., 1 byte) of memory to store information. This allows for 256 discrete levels for each channel. Such a representation requires extensive memory and storage resources, and does not take advantage of the fact that images have spatial locality, e.g., neighboring pixels will often have same, or similar, values, therefore storing this amount of information for each pixel is often not required in practice.

Compression techniques allow to reduce the amount of memory utilized. Digital images are ultimately viewed by humans, and levels of detail and perception come down to what a human eye is physically capable of discerning, and what a human brain is capable of processing. It is therefore an aim of a compression technique, according to certain embodiments, to reduce an amount of memory, storage, and the like, required for representing a digital image, while maintaining an image quality which a human is incapable of distinguishing from an uncompressed image. In some embodiments, a level of compression is achieved which a human is able to discern is of reduced quality when compared to an original but does not detract from an overall viewing experience. In other words, some embodiments employ compression which has acceptable loss of information. As what is acceptable is subjective, it is further advantageous in some embodiments to control an amount of compression performed.

According to an embodiment, a block of pixels (also referred to as simply 'a block') includes four adjacent pixels. A first pixel 112, a second pixel 114, a third pixel 116, and a fourth pixel 118, are arranged such that the first pixel 112 shares a border with the second pixel 114 and the third pixel 116, and the fourth pixel 118 which is diagonal to the first pixel 112, shares a border with the second pixel 114 and the third pixel 116. In certain embodiments, a block of pixels includes four adjacent pixels arranged as a row, arranged as a column, and the like.

In an embodiment, each pixel is represented according to an RGBA color model, such that a plurality of bits 120 represent, for example, the fourth pixel 118. The plurality of bits 120 is divided into portions, so that each portion represents a channel of the fourth pixel 118. For example, in an embodiment, a first portion of bits 122 encodes a representation of a red channel, a second portion of bits 124 encodes a representation of a green channel, a third portion of bits 126 encodes a representation of a blue channel, and a fourth portion of bits 128 encodes a representation of an alpha channel.

In some embodiments, a block includes four pixels. In certain embodiments, a number of pixels in a block is proportional to an amount of data which is compressible. This means, for example, that for a larger block of pixels, utilizing the same compression, more data would be lost, statistically. This is due to variance in color values, which grows larger the larger a block of pixels is.

For example, in an embodiment where a block size includes 16 pixels (i.e., 4 pixels by 4 pixels) the perceived loss will seem larger, on average, than a compression utilizing 4 pixels (i.e., 2 pixels by 2 pixels). This effect is especially prominent in edge cases. An edge case is a section of an image where two distinct colors meet. For example, an image of the beach will have a large portion dominated by various blue colored pixels (i.e., the ocean), and a portion dominated by various yellow colored pixels (i.e., sand). Where these two portions meet is an edge. A larger block of pixels which encompasses an edge must lose a lot of data in order to be compressed to a predefined size, due to the distance in values between the two portions. Smaller blocks are therefore more beneficial, in some embodiments, which include edge cases, as they allow to compress data on one hand, while losing little perceptible image quality, on the other hand.

Figure 2:
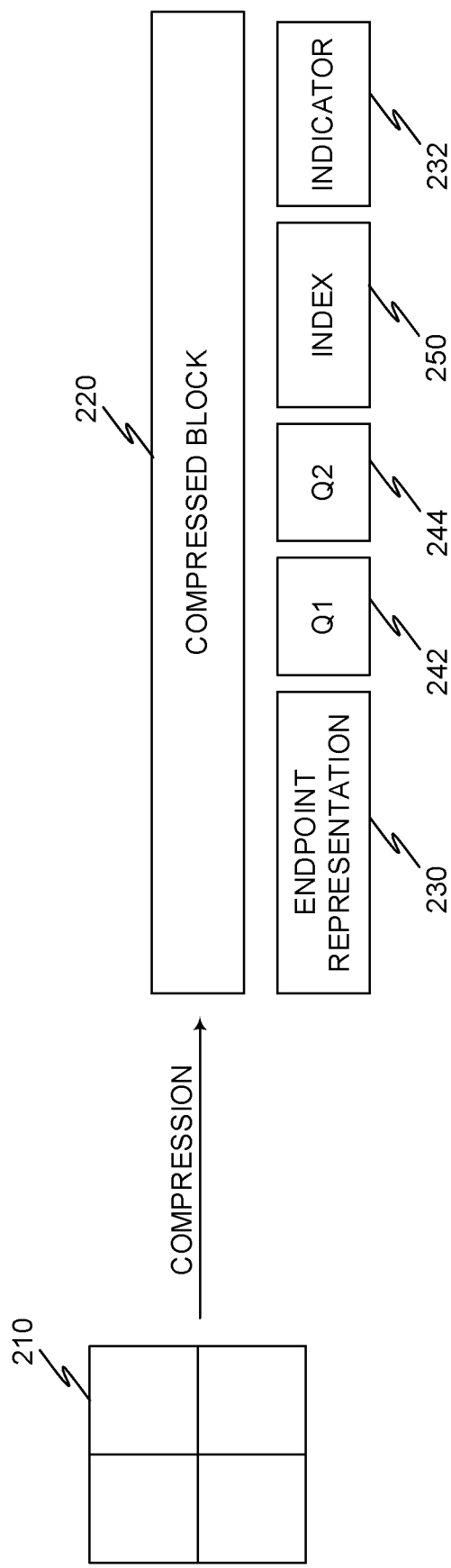
FIG. 2 is an example schematic diagram of a block compression scheme, implemented in accordance with an embodiment.

FIG. 2 is an example schematic diagram of a block compression scheme, implemented in accordance with an embodiment. In an embodiment, a block 210 is compressed utilizing a block compression scheme to generate a compressed block 220. In certain embodiments, the compressed block 220 is stored in a memory, a storage, an in-chip memory, an off-chip memory, and the like.

In an embodiment, a first pixel and a second pixel are selected as endpoints of the block, and the remaining two pixels are represented relative to the first pixel and the second pixel. In some embodiments, a comparator circuitry receives values of each pixel of a pixel block, and selects the endpoint pixels based on a result of comparing a value of each pixel to a corresponding value of each of the other pixels.

In some embodiments, the compressed block 220 includes a plurality of representations, such as an endpoint representation 230, a first color quantization level representation 242, a second color quantization level representation 244, an index value 250, and an endpoint representation indicator 232 (also referred to as indicator 232). In an embodiment, each representation includes a number of bits. In some embodiments, the total number of bits utilized by the compressed block 220 is 48 bits (i.e., 6 bytes, or 3 words, depending on how data is addressed).

For example, in an embodiment, 38 bits are utilized by the endpoint representation 230, 3 bits are utilized by the first color quantization level representation 242, 3 bits are utilized by the second color quantization level representation 244, 3 bits are utilized by the index value 250, and 1 bit is utilized by the indicator 232.

In certain embodiments, setting the indicator 232 to one of a predetermined binary values indicates a first encoding of the endpoints, and setting the indicator 232 to the second of the predetermined values indicates a second encoding of the endpoints. For example, in an embodiment, a first encoding includes absolute values of a channel representation for each endpoint, while a second encoding includes a full representation for a first endpoint, and an offset representation, based on the full representation, for a second endpoint. Such a representation is discussed in more detail with respect to FIG. 3 below.

In an embodiment, a color quantization level is represented by 3 bits, allowing for up to 8 states. In some embodiments, each color quantization level is relative by some predetermined relation to a value of the first endpoint, a value of the second endpoint, a combination thereof, and the like. For example, in an embodiment, a first color quantization level represents a first coefficient multiplied by a value of the first endpoint, combined with a second coefficient multiplied by a corresponding value of the second endpoint. Representation of color quantization levels is discussed in more detail with respect to FIG. 4 below.

In some embodiments, an index value 250 represents the endpoint selection. In an embodiment, the index value 250 represents one of six possible states of endpoint selections. An example of endpoint selection and representation thereof is discussed in more detail with respect to FIG. 5. In some embodiments, utilizing 3 bits to represent six states leaves two states which can be utilized to represent something else.

For example, in certain embodiments, the remaining two states can be utilized to represent another color quantization levels, for example by assigning a first state to the first quantization and the second state to the second quantization. In such an embodiment, a color quantization level corresponding to a first pixel, and a color quantization level corresponding to a second pixel, are represented together with a representation of an indexing value, discussed in more detail below.

Figure 3:
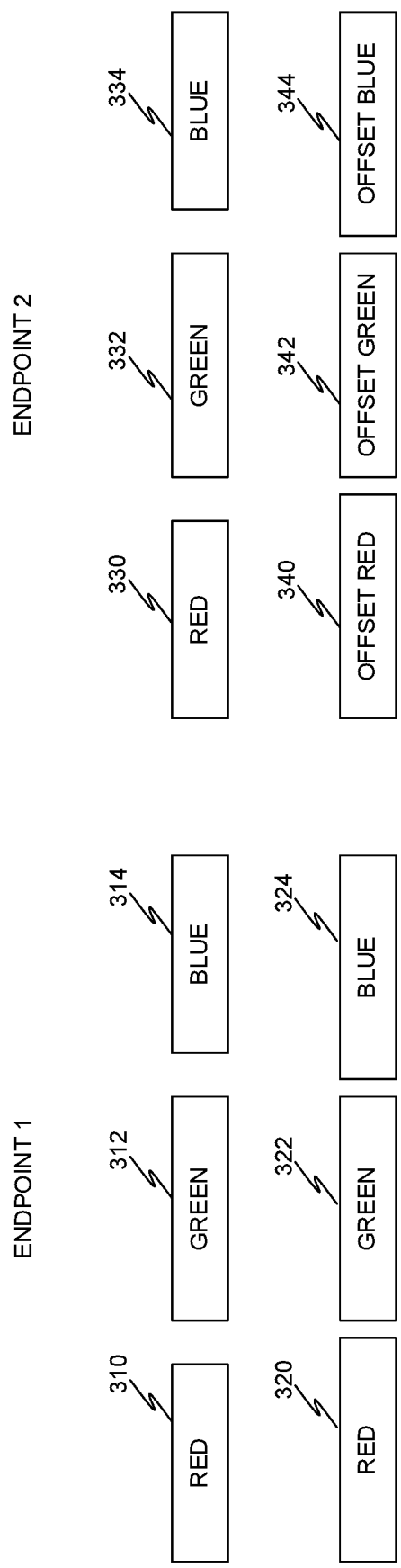
FIG. 3 an example of endpoint compression in a block compression scheme, implemented in accordance with an embodiment.

FIG. 3 an example of endpoint compression in a block compression scheme, implemented in accordance with an embodiment. In an embodiment, a fixed number of bits is assigned to a representation of the endpoints of a block of pixels. According to an embodiment, it is beneficial to utilize an encoding which reduces an amount of information which is lost in compression. Therefore, in an embodiment, it is beneficial to utilize multiple encodings and select an encoding on a case by case basis. For example, in an embodiment encoding is selected based on a result of a comparator circuitry which is provided with values of each pixel of the block.

In an embodiment, 38 bits total are provided to represent both endpoints. In some embodiments, a red channel of each endpoint is represented by 6 bits, a green channel of each endpoint is represented by 7 bits, and a blue channel of each endpoint is represented by 7 bits. Therefore, the red channel value corresponds to one of 64 discrete values, the green channel value corresponds to one of 128 discrete values, and the blue channel value corresponds to one of 64 discrete values. In such a representation, the value of the green channel is at most removed by one level from the full 8 bit representation, and the values of each of the red and blue channels are removed at most by 2 levels from the full 8 bit representation of their respective values.

For example, in an embodiment, a red channel 310 of a first endpoint is represented by 6 bits, a green channel 312 of the first endpoint is represented by 7 bits, a blue channel 314 of the first endpoint is represented by 6 bits, a red channel 330 of a second endpoint is represented by 6 bits, a green channel 332 of the second endpoint is represented by 7 bits, and a blue channel 334 of the second endpoint is represented by 6 bits, making for 38 bits total.

In some embodiments, a first endpoint is encoded without loss of precision (i.e., 8 bits per channel), and a second endpoint is encoded based off of the encoding of the first endpoint. For example, in an embodiment the second endpoint is encoded by encoding an offset relative to the first endpoint. This encoding of relative values is useful for example, in embodiments where the distance between values is below a predetermined threshold, thus allowing to preserve a higher level of detail.

For example, in an embodiment, a red channel 320 of a first endpoint is represented by 8 bits, a green channel 322 of the first endpoint is represented by 8 bits, a blue channel 324 of the first endpoint is represented by 8 bits, a red channel 340 of a second endpoint is represented by 5 bits, a green channel 342 of the second endpoint is represented by 5 bits, and a blue channel 344 of the second endpoint is represented by 4 bits, making for 38 bits total.

In certain embodiments, it is advantageous to encode a green channel using more bits than encoding a red channel, or a blue channel. This is due to a human eye being more sensitive to wavelengths corresponding to green light than it is sensitive to red or blue wavelengths. In some embodiments, it is further advantageous to encode a red channel utilizing more bits than an encoding for a blue channel, but less bits than an encoding of a green channel of the same pixel. In the example above, in another embodiment a red channel 330 of a second endpoint is represented by 7 bits, a green channel 332 of the second endpoint is represented by 7 bits, and a blue channel 334 of the second endpoint is represented by 5 bits.

In one embodiment, a value of an uncompressed red channel is between 0 and 255, represented by an 8 bit encoding, corresponding to 256 possible states. An uncompressed value of a red channel of a first endpoint is 100, and a value of an uncompressed value of a red channel of a second endpoint is 103. When compressed using absolute values, the value of each red channel is encoded as 100, losing some precision and therefore reducing quality. However, by encoding a base value for the first endpoint and encoding an offset value for the second endpoint, the precision is preserved and therefore image quality is not reduced.

Figure 4:
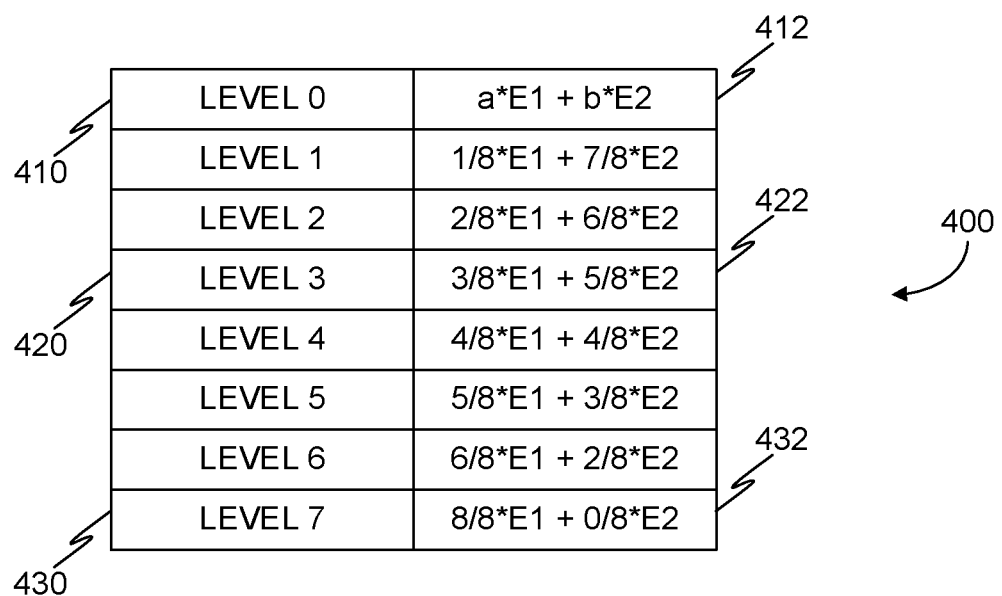
FIG. 4 is an example table of color quantization levels for a block compression scheme, implemented in accordance with an embodiment.

FIG. 4 is an example table of color quantization levels for a block compression scheme, implemented in accordance with an embodiment. In an embodiment, a color quantization table 400 is utilized with predetermined color levels, such that each color level is based off of a value of a first endpoint, a value of a second endpoint, a combination thereof, and the like.

For example, in an embodiment, value representing a color of a first pixel, which is not an endpoint pixel, is determined based on a first level 410. The first level 410 includes a predetermined function which is utilized to determine, based on an input of an endpoint, an output (i.e., a value) representing a color of the first pixel.

In some embodiments, the first level 410 includes a first coefficient ('a') multiplied by a value of a first endpoint, and a second coefficient ('b') multiplied by a value of a second endpoint. In certain embodiments, the values of the first coefficient and the second coefficient are predetermined.

For example, in an embodiment the color quantization table includes coefficients which are fractions of eighths (e.g., one eighths, two eighths, etc.). For example, in an embodiment, a fourth level 420 includes generates an output value utilizing a function 422 having a coefficient of three eighths of a value of the first endpoint, and five eighths of a value of a second endpoint. In certain embodiments, an eighth level 430 includes only the first endpoint value, or only the second endpoint value. In some embodiments, each coefficient is a floating point number, a fixed point number, any encoded number, and the like.

In an embodiment, where 3 bits are used to represent the different states in which the coefficients are fractions of an eighth, it is apparent that a state is missing, as in fact 9 states are required to fully represent each combination of coefficients (0 through 8). Therefore, in some embodiments, where an indexing, which requires only 6 states, is represented by 3 bits, the two states which are not utilized by the indexing can be used to encode an additional color level for each of the color quantization levels representing each bit which are not the endpoint bits.

In such embodiments, the quantization levels and indexing are represented using a plurality of bits (e.g., a total of 9 bits) such that each unique representation of bits corresponds to a unique quantization of a first pixel, a unique quantization of a second pixel, and an index value. In other words, in certain embodiments, a representation of the quantization levels and the indexing is mixed together, in order to utilize the available states which are not utilized by the indexing states.

For example, in an embodiment, nine color quantization levels are represented for each of the first pixel and second pixel (which are not endpoint pixels). Additionally, six states are represented for each of the endpoint selections, as depicted in more detail in FIG. 5 below. In an embodiment, each quantization level requires 4 bits to represent 16 states, and endpoint selection requires 3 bits to represent 6 states, making for a total of 11 bits. In certain embodiments, by mixing states of the quantization levels and states of endpoint selection, a total of 486 unique states require representation, which is possible using 9 bits (which can represent up to 512 unique states).

In some embodiments, a first quantization table having a first set of coefficients corresponds to a first pixel which is not an endpoint pixel, and a second quantization table having a second set of coefficients corresponds to a second pixel which is not an endpoint pixel. In certain embodiments, a set of coefficients includes coefficient pairs (i.e., a first coefficient which is applied to a value of the first endpoint and a second coefficient which is applied to a value of the second endpoint) which correspond to each of a plurality of levels.

Figure 5:
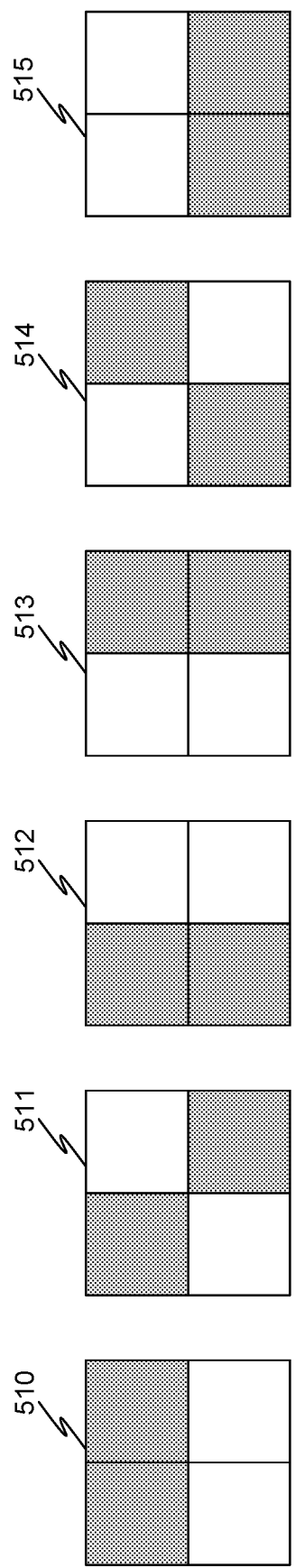
FIG. 5 is an example of endpoint selection mapping utilized in block compression, implemented in accordance with an embodiment.

FIG. 5 is an example of endpoint selection mapping utilized in block compression, implemented in accordance with an embodiment.

In an embodiment, endpoint selection mapping includes storing an index value, such as index value 250 of FIG. 2 above. This allows to encode a position of endpoints within the pixel block. For example, in an embodiment, a block of pixels includes six states which correspond to endpoint positions. In certain embodiments, a first state 510 corresponds to a pair of top pixels selected as the endpoints, a second state 511 corresponds to a left diagonal selection of pixels, a third state 512 corresponds to selection of the two left pixels, a fourth state 513 corresponds to a selection of the two right pixels, a fifth state 514 corresponds to selection of the right diagonal pixels, and a sixth state 515 corresponds to selection of the two bottom pixels.

In some embodiments, selection of the endpoint positions also provides an indication of the remaining pixels. In certain embodiments, the endpoints are further predetermined for each state, so that, for example, for the third state 512 the top left pixel is the first endpoint and the bottom left pixel is the second endpoint.

In certain embodiments, selection of an index value corresponding to a state of endpoint positions is performed based on a comparison of pixel values. For example, in an embodiment, endpoint values are selected based on determining the smallest value of a pixel (i.e., min value), the largest value of a pixel (i.e., max value), the average value of all four pixels of the pixel block, combinations thereof, and the like.

In an embodiment, three states are distinguished (e.g., the first state 510, the second state 511, and the third state 512), and a mirror bit is set to a binary value, such that when the mirror bit is set to a first value a state is selected, and when the mirror bit is set to a second value a mirror state is selected. For example, in an embodiment the first state 510 is selected, and when the mirror bit is selected to a value reflecting that the mirror state should be used, endpoint selection is performed based on the sixth state 515, which is the mirror state of the first state 510.

Figure 6:
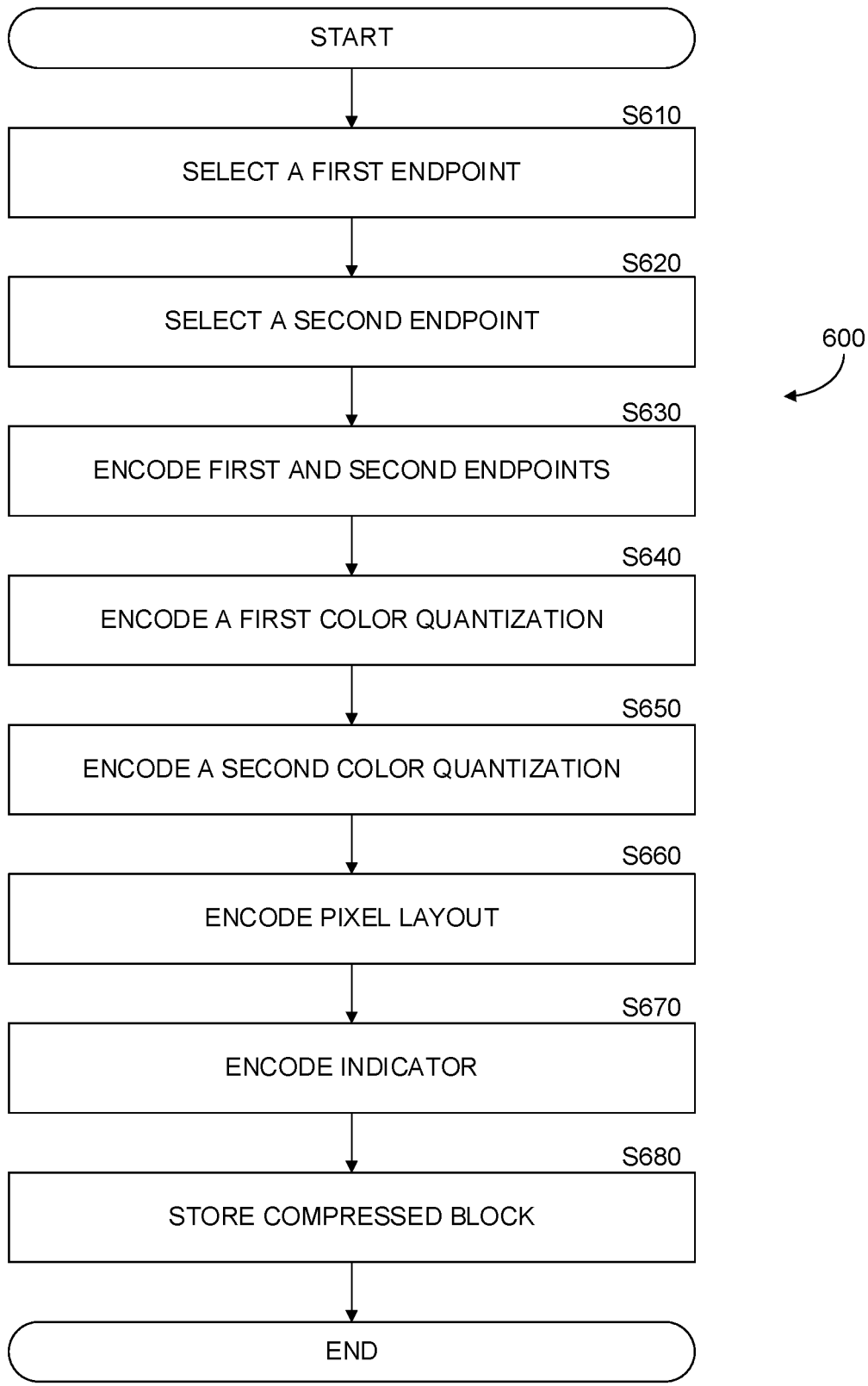
FIG. 6 is an example flowchart of a method for performing block compression, implemented in accordance with an embodiment.

FIG. 6 is an example flowchart of a method for performing block compression, implemented in accordance with an embodiment. In certain embodiments, the block compression is performed on a block of four pixels, arranged in a two by two matrix.

At S610, a first endpoint is selected. In an embodiment, an endpoint is one pixel of the pixel block. In some embodiments, a pixel is represented by a plurality of values, each value corresponding to a color channel (e.g., red, green, blue, etc.).

In an embodiment, an endpoint is selected by providing a value of a first pixel and a value of a second pixel to a comparator circuit. In some embodiments, endpoint selection is performed by selecting a pixel with the highest value, selecting a pixel having the lowest value, selecting a pixel having the lowest distance from a plurality of pixels, selecting a pixel based on an average value of a plurality of pixels of the pixel block, a combination thereof, and the like. In an embodiment, a distance between a pair of pixels is determined based on a distance function which receives a value of a first pixel and a value of a second pixel as inputs.

At S620, a second endpoint is selected. In an embodiment, the second endpoint is one pixel of the pixel block, which is not the first endpoint. In some embodiments, a pixel is represented by a plurality of values, each value corresponding to a color channel (e.g., red, green, blue, etc.).

In an embodiment, a second endpoint is selected by providing a value of a second pixel and a value of a third pixel to a comparator circuit. In some embodiments, endpoint selection is performed by selecting a pixel with the highest value, selecting a pixel having the lowest value, selecting a pixel having the lowest distance from a plurality of pixels, selecting a pixel based on an average value of a plurality of pixels of the pixel block, a combination thereof, and the like. For example, in an embodiment the first endpoint is a pixel having the highest value in the pixel block, as determined by the comparator, and the second endpoint is a pixel having the lowest value than any other pixel in the pixel block.

In certain embodiments, the first endpoint is a pixel having the largest distance between the pixel and other pixels in the pixel block, and the second endpoint is a pixel having the shortest distance between the pixel and other pixels in the pixel block. In some embodiments, a distance between a pair of pixels is determined based on a distance function which receives a value of a first pixel and a value of a second pixel as inputs.

At S630, the first endpoint and second endpoint are encoded. In some embodiments, the endpoint encoding is of absolute values. In certain embodiments, the endpoint encoding is of an absolute value and an offset value, wherein the second endpoint is encoded based on an offset of an encoding of the first endpoint.

For example, in an embodiment, absolute value encoding includes representing a red channel of each endpoint by 6 bits, representing a green channel of each endpoint by 7 bits, and representing a blue channel of each endpoint by 7 bits. Therefore, the red channel value corresponds to one of 64 discrete values, the green channel value corresponds to one of 128 discrete values, and the blue channel value corresponds to one of 64 discrete values. In such a representation, the value of the green channel is at most removed by one level from the full 8 bit representation, and the values of each of the red and blue channels are removed at most by 2 levels from the full 8 bit representation of their respective values.

In some embodiments, offset (also referred to as 'relative') encoding includes representing a red channel of the first endpoint by 8 bits, representing a green channel of the first endpoint by 8 bits, representing a blue channel of the first endpoint by 8 bits, representing a red channel of a second endpoint utilizing 5 bits, representing a green channel of the second endpoint utilizing 5 bits, and representing a blue channel of the second endpoint utilizing 4 bits. Each of the above example representations utilizes a total of 38 bits, however other embodiments utilizing a different number of bits are also possible.

At S640, a first color quantization is encoded. In some embodiments, the first color quantization is encoded for a pixel which is not the first endpoint or the second endpoint. In an embodiment, the first color quantization is encoded as a function of a value of the first endpoint, a value of the second endpoint, a combination thereof, and the like.

For example, in an embodiment, a color quantization table is predetermined with a plurality of states (also referred to as 'levels'), each state corresponding to a function which includes a first coefficient applied to a value of the first endpoint, a second coefficient applied to a value of the second endpoint, a combination thereof, and the like.

In certain embodiments, a set of coefficients includes coefficient pairs (i.e., a first coefficient which is applied to a value of the first endpoint and a second coefficient which is applied to a value of the second endpoint) which correspond to each of a plurality of levels.

In an embodiment, a color quantization includes coefficients which are fractions of eighths (e.g., one eighths, two eighths, etc.). For example, in an embodiment, a fourth level includes an output value utilizing a function having a coefficient of three eighths of a value of the first endpoint, and five eighths of a value of a second endpoint. In certain embodiments, an eighth level includes only the first endpoint value, or only the second endpoint value.

At S650, a second color quantization is encoded. In some embodiments, the second color quantization is encoded for a pixel which is not the first endpoint, the second endpoint, or the pixel of the first color quantization. In an embodiment, the second color quantization is encoded as a function of a value of the first endpoint, a value of the second endpoint, a combination thereof, and the like.

For example, in an embodiment, a second color quantization table is predetermined with a plurality of states (also referred to as 'levels'), each state corresponding to a function which includes a first coefficient applied to a value of the first endpoint, a second coefficient applied to a value of the second endpoint, a combination thereof, and the like.

In certain embodiments, a set of coefficients includes coefficient pairs (i.e., a first coefficient which is applied to a value of the first endpoint and a second coefficient which is applied to a value of the second endpoint) which correspond to each of a plurality of levels.

In an embodiment, a color quantization includes coefficients which are fractions of eighths (e.g., one eighths, two eighths, etc.). For example, in an embodiment, a fourth level includes generating an output value utilizing a function having a coefficient of three eighths of a value of the first endpoint, and five eighths of a value of a second endpoint. In certain embodiments, an eighth level includes only the first endpoint value, or only the second endpoint value.

In some embodiments, a first color quantization table is utilized for the first pixel, and a second color quantization table is utilized for the second pixel. In an embodiment, the first color quantization table is different from the second color quantization table by at least a first level of the first color quantization table having a coefficient for a first endpoint which is unequal to a corresponding coefficient of the first quantization in a corresponding first level of the second color quantization table. For example, a value of the first endpoint coefficient of the first level of the first color quantization table is 0.5 and a value of the first endpoint coefficient of the first level of the second color quantization table is 0.45., according to an embodiment.

At S660, a pixel layout is encoded. In an embodiment, encoding the pixel layout includes encoding an index value, for example as discussed in more detail with respect to FIG. 5 above. In some embodiments, the pixel layout includes a position of the first endpoint and the second endpoint. In certain embodiments, the pixel layout corresponds to a map. In some embodiments, the map includes six distinct states, for example as shown in FIG. 5 above. In an embodiment, the pixel layout is represented utilizing 3 bits of information.

In some embodiments, where a pixel layout encoding requires only 6 states, and the encoding is performed utilizing 3 bits, there are two states which are not utilized by the encoding. In an embodiment, the two unused states can be used to encode an additional color level for each of the color quantization levels.

In an embodiment, three states are distinguished, and an additional three states are referenced as mirror states for each of the three distinguished states. In an embodiment, a mirror bit is set to a binary value, such that when the mirror bit is set to a first value a state is selected, and when the mirror bit is set to a second value a mirror state is selected.

For example, in an embodiment a first state is selected, indicating that the top two pixels are endpoints. In an embodiment where the mirror bit is selected to a value reflecting that the mirror state should be used, the bottom two pixels are selected as endpoints, which is the mirror state of the first state.

At S670, an indicator is encoded. In an embodiment, the indicator is a bit, a plurality of bits, and the like, which are utilized to indicate which encoding should be used for representing the endpoints. For example, in an embodiment an indicator bit is set to a first binary value to indicate that a first encoding (e.g., absolute values) should be utilized. In certain embodiments, the indicator bit is set to a second binary value to indicate that a second encoding (e.g., offset values) should be utilized. In some embodiments, a plurality of indicator bits are utilized to further distinguish between encodings. For example, in an embodiment a first absolute value encoding encodes a green channel utilizing 8 bits, and a second absolute value encoding encodes a green channel utilizing 7 bits.

At S680, the compressed block is stored. In an embodiment, the compressed block is stored as a plurality of bytes, as a plurality of words, as a plurality of bits, a combination thereof, and the like. In certain embodiments, the compressed block is stored in a memory, such as an in-chip memory, an off-chip memory, and the like. In some embodiments, the compressed block is stored in a storage device, such as a non-volatile memory, a solid state storage device, a magnetic storage device, an optical storage device, a combination thereof, and the like.

Figure 7:
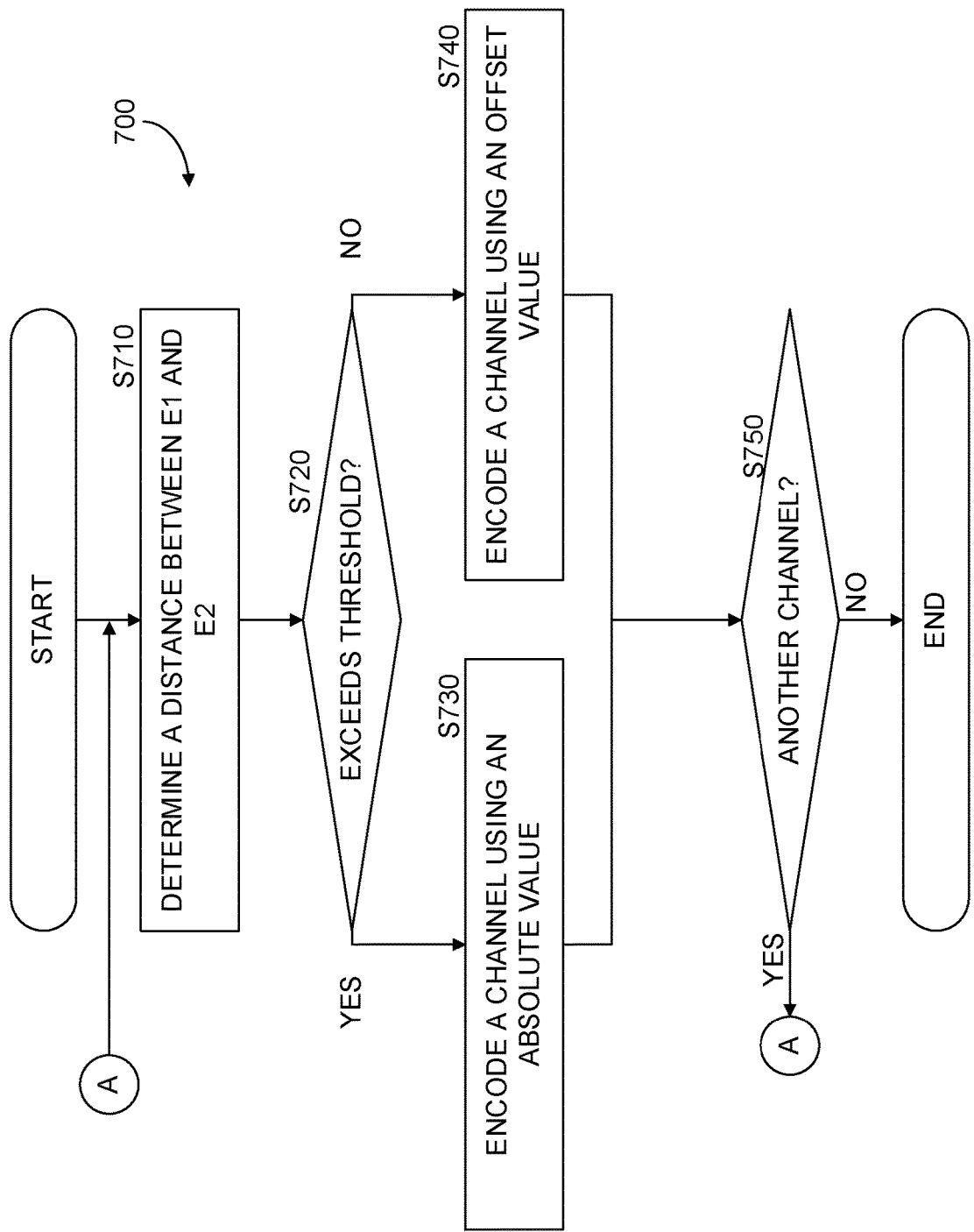
FIG. 7 is an example flowchart of a method for endpoint encoding in block compression, implemented in accordance with an embodiment.

FIG. 7 is an example flowchart of a method for endpoint encoding in block compression, implemented in accordance with an embodiment. In an embodiment, the method includes selecting between a first encoding scheme and a second encoding scheme. In other embodiments, a plurality of encoding schemes are utilized, each selected based on endpoint encoding selection bit values.

At S710, a distance is determined between a first endpoint and a second endpoint. In some embodiments, the distance is determined between a first channel (e.g., a red channel) of the first endpoint and a second channel of the second endpoint, which corresponds to the first channel of the first endpoint.

In an embodiment, a distance is determined by comparing a first value of the first endpoint with a second value of the second endpoint. For example, in an embodiment, a result is generated by subtracting the first value from the second value. The result is compared to a predetermined threshold, in some embodiments, to determine for example if a first encoding should be used.

In some embodiments, a distance vector is determined between the first endpoint and the second endpoint in a color space. For example, in an RGB color space, green is closer to yellow than green is to red. In certain embodiments, the distance vector is compared to a predetermined threshold to determine if the result exceeds, meets, or is below, the threshold.

At S720, a check is performed to determine if the distance exceeds a threshold. In some embodiments, the check is performed to determine if the distance is below a threshold. In certain embodiments, the threshold is constant, dynamic, adaptive, a combination thereof, and the like. In an embodiment, where the distance exceeds the threshold, execution continues at S730. In some embodiments, where the distance does not exceed the threshold, execution continues at S740. In certain embodiments where the distance is equal to the threshold, the distance is not considered to exceed the threshold.

At S730, a channel of the first endpoint and a corresponding channel of the second endpoint are encoded using an absolute value. In certain embodiments, RGB channels of the first endpoint and RGB channels of the second endpoint are all encoded using absolute values. In certain embodiments a first channel of the first endpoint is encoded using an absolute value, and a second channel of the first endpoint is encoded using a second encoding scheme. In some embodiments, the second encoding scheme is an absolute value encoding scheme utilizing a different number of bits. In certain embodiments, the second encoding is an offset value scheme.

For example in an embodiment, an absolute value encoding includes representing a red channel a first endpoint utilizing 6 bits, representing a green channel of the first endpoint utilizing 7 bits, representing a blue channel of the first endpoint utilizing 6 bits, representing a red channel of a second endpoint utilizing 6 bits, representing a green channel of the second endpoint utilizing 7 bits, and representing a blue channel of the second endpoint utilizing 6 bits. In certain embodiments, the green channel is represented using 8 bits, the blue channel is represented using 5 bits, and the red channel is represented using 6 bits.

At S740, a channel of the first endpoint and a channel of the second endpoint are encoded using an offset encoding scheme. In an embodiment, an offset encoding scheme encodes a first channel of a first endpoint using uncompressed data (i.e., 8 bits per channel) and a second channel of a second endpoint using an offset (e.g., using 4 bits, using 5 bits, etc.).

In certain embodiments, RGB channels of the first endpoint and RGB channels of the second endpoint are all encoded using offset values. where the second endpoint is offset from the values of the first endpoint. In certain embodiments a first channel of the second endpoint is encoded using an offset value, and a second channel of the second endpoint is encoded using a second encoding scheme. In certain embodiments, the second encoding scheme is an absolute value encoding.

In some embodiments, a first endpoint is encoded without compression, and a second endpoint is encoded with a compression which is based off of the encoding of the first endpoint. For example, in an embodiment the second endpoint is encoded by encoding an offset relative to the first endpoint. This encoding of relative values is useful for example, in embodiments where the distance between values is below a predetermined threshold, thus allowing to preserve a higher level of detail.

For example, in an embodiment, a red channel of a first endpoint is represented by 8 bits, a green channel of the first endpoint is represented by 8 bits, a blue channel of the first endpoint is represented by 8 bits, a red channel of a second endpoint is represented by 5 bits, a green channel of the second endpoint is represented by 5 bits, and a blue channel of the second endpoint is represented by 4 bits, making for 38 bits total.

At S750, a check is performed to determine if another channel should be encoded. In some embodiments, where all channels are encoded using the same encoding scheme (e.g., absolute value, offset value, etc.), the check of S750 is performed to determine if another block should be encoded. If 'yes' execution continues at S710, according to an embodiment.

Figure 8:
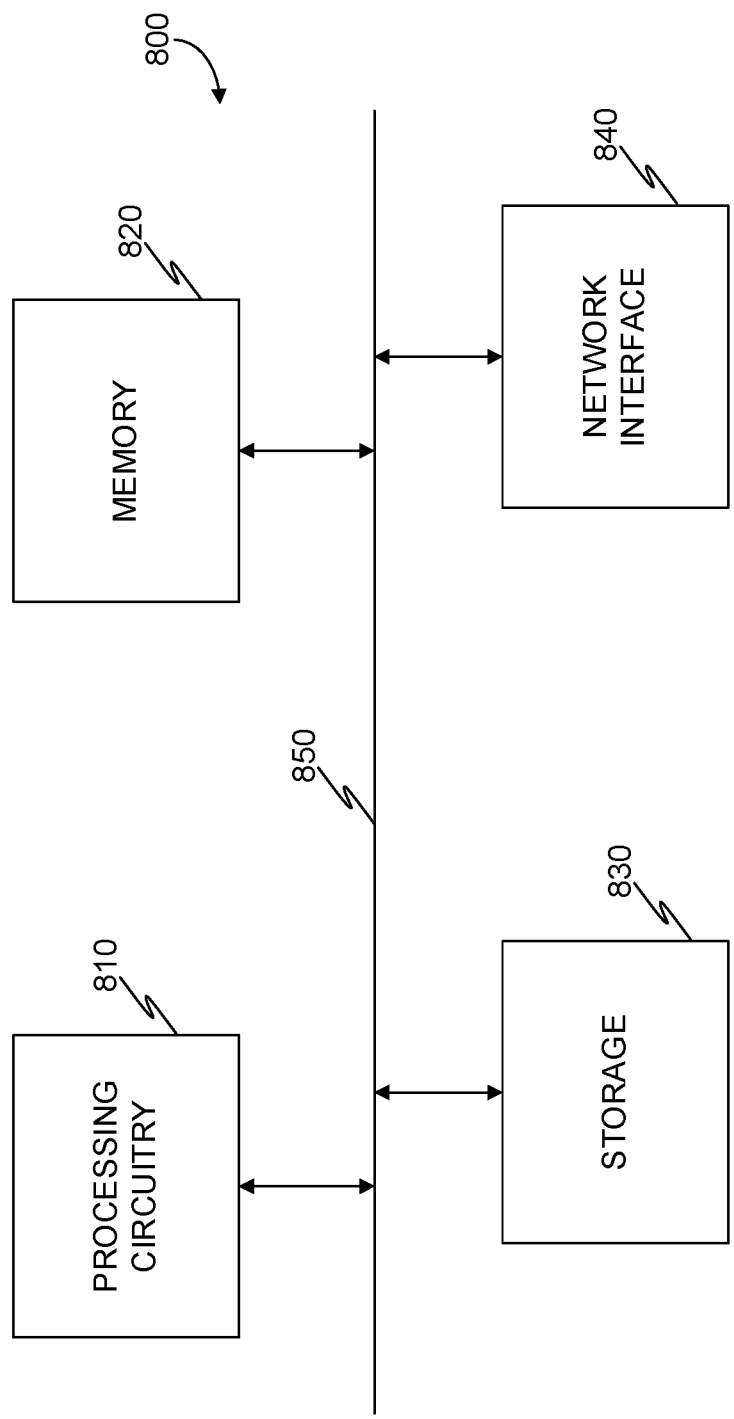
FIG. 8 is a computing system implementing a block compression scheme, utilized to describe an embodiment.

FIG. 8 is a computing system 800 implementing a block compression scheme, utilized to describe an embodiment. The system 800 includes a processing circuitry 810 coupled to a memory 820, a storage 830, and a network interface 840. In an embodiment, the components of the system 800 may be communicatively connected via a bus 850.

The processing circuitry 810 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), general purpose GPUs (GPGPUs), tensor processing units (TPUs), general-purpose microprocessors, microcontrollers, digital signal processors (DSPs), and the like, or any other hardware logic components that can perform calculations or other manipulations of information. In an embodiment, the processing circuitry 810 includes a comparator circuit which is configured to receive as an input a first value and a second value and generate a comparison therebetween. In some embodiments, the processing circuitry 810 further includes a texture mapping unit (TMU), a z-buffer unit, a shader unit, a rasterizer, a framebuffer, a blender, and the like.

The memory 820 may be volatile (e.g., random access memory, etc.), non-volatile (e.g., read only memory, flash memory, etc.), or a combination thereof. In an embodiment, the memory 820 is an on-chip memory, an off-chip memory, a combination thereof, and the like. In certain embodiments, the memory 820 is a scratch-pad memory for the processing circuitry 810.

In one configuration, software for implementing one or more embodiments disclosed herein may be stored in the storage 830, in the memory 820, in a combination thereof, and the like. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 810, cause the processing circuitry 810 to perform the various processes described herein.

The storage 830 is a magnetic storage, an optical storage, a solid-state storage, a combination thereof, and the like, and is realized, according to an embodiment, as a flash memory, as a hard-disk drive, or other memory technology, or any other medium which can be used to store the desired information.

The network interface 840 is configured to provide the system 800 with communication with, for example, a computer network.

It should be understood that the embodiments described herein are not limited to the specific architecture illustrated in FIG. 8, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for fixed size texture compression, comprising:
    determining a first endpoint of a pixel block including four pixels, each pixel represented by a red channel, a green channel and a blue channel, wherein the first endpoint is a pixel of the pixel block;
    determining a second endpoint of the pixel block, which is not the first endpoint, wherein the second endpoint is another pixel of the pixel block;
    encoding the first endpoint and the second endpoint using a first plurality of bits;
    encoding a first quantization level using a second plurality of bits;
    encoding a second quantization level using a third plurality of bits;
    encoding a location of the first endpoint and a location of the second endpoint using a fourth plurality of bits; and
    encoding an addressing indicator bit based on a distance between a value of the first endpoint and a value of the second endpoint.

2. The method of claim 1, further comprising:
    storing the first endpoint utilizing a first encoding of nineteen bits and storing the second endpoint utilizing a second encoding of nineteen bits in response to determining that the addressing indicator bit has a first binary value.

3. The method of claim 2, wherein the first encoding represents a red channel with 6 bits, a green channel with 7 bits, and a blue channel with 6 bits.

4. The method of claim 2, wherein the second encoding represents a red channel with 6 bits, a green channel with 7 bits, and a blue channel with 6 bits.

5. The method of claim 1, further comprising:
    storing the first endpoint utilizing twenty four bits and storing the second endpoint utilizing a third encoding of fourteen bits in response to determining that the addressing indicator bit has a second binary value.

6. The method of claim 5, wherein the third encoding represents an offset from a green channel of the first endpoint with 5 bits.

7. The method of claim 5, wherein the third encoding further represents an offset from the red channel of the first endpoint with 5 bits.

8. The method of claim 1, further comprising:
    encoding the first endpoint using 24 bits; and
    encoding the second endpoint such that each value of a channel of the second endpoint is encoded relative to a value of a corresponding channel of the first endpoint.

9. The method of claim 1, further comprising:
    encoding a green channel of the first endpoint using a first portion of the first plurality of bits;
    encoding a red channel of the first endpoint using a second portion of the first plurality of bits; and
    encoding a blue channel of the first endpoint using a third portion of the first plurality of bits, wherein a number of bits of the first portion is greater than a number of bits of each of the second portion and the third portion.

10. A non-transitory computer readable medium having stored thereon instructions for causing a processing circuitry to execute a process, the process comprising:
    determining a first endpoint of a pixel block including four pixels, each pixel represented by a red channel, a green channel and a blue channel, wherein the first endpoint is a pixel of the pixel block;

determining a second endpoint of the pixel block, which is not the first endpoint, wherein the second endpoint is another pixel of the pixel block;

encoding the first endpoint and the second endpoint using a first plurality of bits;

encoding a first quantization level using a second plurality of bits;

encoding a second quantization level using a third plurality of bits;

encoding a location of the first endpoint and a location of the second endpoint using a fourth plurality of bits; and encoding an addressing indicator bit based on a distance between a value of the first endpoint and a value of the second endpoint.

11. A system for fixed size texture compression, comprising:

a processing circuitry; and a memory, the memory containing instructions that, when executed by the processing circuitry, configure the system to:

determine a first endpoint of a pixel block including four pixels, each pixel represented by a red channel, a green channel and a blue channel, wherein the first endpoint is a pixel of the pixel block;

determine a second endpoint of the pixel block, which is not the first endpoint, wherein the second endpoint is another pixel of the pixel block;

encode the first endpoint and the second endpoint using a first plurality of bits;

encode a first quantization level using a second plurality of bits;

encode a second quantization level using a third plurality of bits;

encode a location of the first endpoint and a location of the second endpoint using a fourth plurality of bits; and encode an addressing indicator bit based on a distance between a value of the first endpoint and a value of the second endpoint.

12. The system of claim 11, wherein the memory contains further instructions which when executed by the processing circuitry further configure the system to:

store the first endpoint utilizing a first encoding of nineteen bits and storing the second endpoint utilizing a second encoding of nineteen bits in response to determining that the addressing indicator bit has a first binary value.

13. The system of claim 12, wherein the first encoding represents a red channel with 6 bits, a green channel with 7 bits, and a blue channel with 6 bits.

14. The system of claim 12, wherein the second encoding represents a red channel with 6 bits, a green channel with 7 bits, and a blue channel with 6 bits.

15. The system of claim 11, wherein the memory contains further instructions which when executed by the processing circuitry further configure the system to:

store the first endpoint utilizing twenty four bits and storing the second endpoint utilizing a third encoding of fourteen bits in response to determining that the addressing indicator bit has a second binary value.

16. The system of claim 15, wherein the third encoding represents an offset from a green channel of the first endpoint with 5 bits.

17. The system of claim 15, wherein the third encoding further represents an offset from the red channel of the first endpoint with 5 bits.

18. The system of claim 11, wherein the memory contains further instructions which when executed by the processing circuitry further configure the system to:

encode the first endpoint using 24 bits; and encode the second endpoint such that each value of a channel of the second endpoint is encoded relative to a value of a corresponding channel of the first endpoint.

19. The system of claim 11, wherein the memory contains further instructions which when executed by the processing circuitry further configure the system to:

encode a green channel of the first endpoint using a first portion of the first plurality of bits;

encode a red channel of the first endpoint using a second portion of the first plurality of bits; and encode a blue channel of the first endpoint using a third portion of the first plurality of bits, wherein a number of bits of the first portion is greater than a number of bits of each of the second portion and the third portion.

* * * * *